United States Patent [19]

Bender et al.

[11] Patent Number: 5,125,282
[45] Date of Patent: Jun. 30, 1992

[54] MOTOR VEHICLE TWO COUNTERSHAFT TRANSMISSION CHANGE-SPEED GEARBOX AND METHOD

[75] Inventors: Helmut Bender, Pleidelsheim; Hans Merkle, Stuttgart; Gerhard Spengler, Herrenberg; Wolfgang Zaiser, Steinheim, all of Fed. Rep. of Germany

[73] Assignee: Mercedes-Benz Aktiengesellschaft, Fed. Rep. of Germany

[21] Appl. No.: 565,475

[22] Filed: Aug. 10, 1990

[30] Foreign Application Priority Data

Aug. 11, 1989 [DE] Fed. Rep. of Germany ....... 3926570

[51] Int. Cl.⁵ .............................................. F16H 3/08
[52] U.S. Cl. ...................................... 74/359; 74/333; 74/745
[58] Field of Search ............... 74/329, 333, 334, 356, 74/359, 360, 745

[56] References Cited

U.S. PATENT DOCUMENTS 3,691,861 9/1972 Stürmer ..................... 74/359 X
4,658,663 4/1987 Hiraiwa .................... 74/359

FOREIGN PATENT DOCUMENTS 0061845 10/1982 European Pat. Off. .
1957144 3/1967 Fed. Rep. of Germany .
3131139 2/1983 Fed. Rep. of Germany .
3831005 4/1989 Fed. Rep. of Germany .
58-180859 10/1983 Japan ................................. 74/356
61-286650 12/1986 Japan ................................. 74/359
1164088 6/1985 U.S.S.R. ............................. 74/745

Primary Examiner—Richard Lorence
Assistant Examiner—Benjamin Levi
Attorney, Agent, or Firm—Evenson, Wands, Edwards, Lenahan & McKeown

[57] ABSTRACT

A change-speed gearbox having two countershaft transmission each connected by a frictional driving clutch to an input shaft and having a single common countershaft. Two gear wheel stages of the countershaft transmissions can be optionally connected into the driving connection between the input and output shafts by a change-speed clutch. One of the two gear wheel stages of one countershaft transmission is allocated to the reverse gear, and one of the two gear wheel stages of the other countershaft transmission is used both in reverse gear and in second gear.

4 Claims, 1 Drawing Sheet

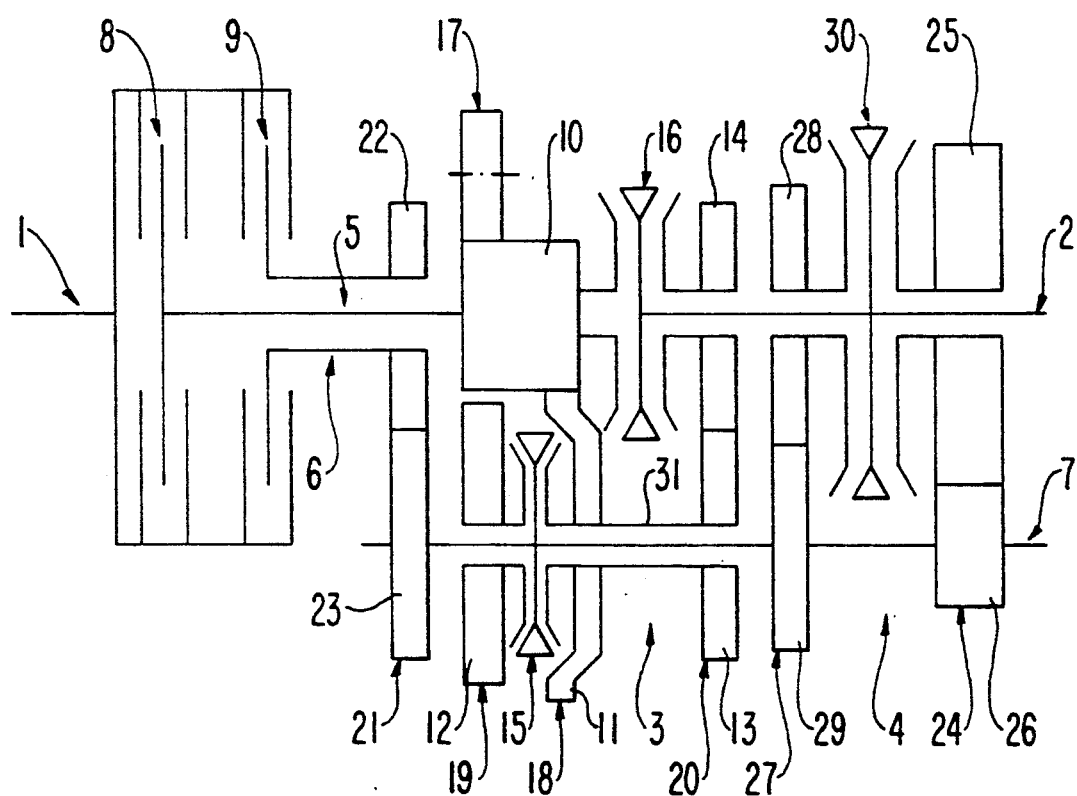

MOTOR VEHICLE TWO COUNTERSHAFT TRANSMISSION CHANGE-SPEED GEARBOX AND METHOD

BACKGROUND AND SUMMARY OF THE INVENTION

The present invention relates to a change-speed gearbox and method and, more particularly, to a change-speed gearbox having six forward gears and one synchronized reverse gear with two countershaft transmissions and only one countershaft in which "rocking out" of the motor vehicle is possible.

In a known change-speed gearbox of the type shown in EP-A3 00 61 845, one countershaft transmission comprises two individual main shaft gear wheels which are connected to the output shaft by a change-speed clutch. A countershaft double gear wheel which meshes by its two gear rims with, in each case, one of the two main shaft gear wheels is connected to the countershaft by a simple gear shift clutch. While one main shaft gear wheel is arranged rotatably on the output shaft, the other main shaft gear wheel is connected directly to the driving clutch engaged in first gear.

In contrast, four gear wheel stages for the other countershaft transmission are arranged in such a way that one gear wheel stage is situated, on one hand, axially between the driving clutches, on the other hand, the first countershaft transmission, and the three other gear wheel stages are situated on that side of the countershaft double gear wheel which is opposite to the driving clutches. The countershaft gear wheels of the last-mentioned three gear wheel stages are each rotatably fixed to the countershaft. The countershaft gear wheel adjacent to the countershaft double gear wheel is arranged in an axially displaceable manner and furthermore is provided with that clutch half of the shifting clutch of the countershaft double gear wheel which is on the shaft side.

The central gear wheel of the three countershaft gear wheels can be brought into tooth engagement with the intermediate gear wheel by displacing the intermediate gear wheel which makes with a toothed rim of a change-speed clutch sliding gear shift sleeve mounted displaceably in a rotatable fixed manner on the output shaft. A change-speed clutch connects the main shaft gear wheels meshing with the two axially outer countershaft gear wheels to the output shaft. Due to the transmission arrangement, the reverse gear in the known change-speed gearbox is not synchronized, and alternate shifting between the reverse gear and one of the two lowest forward gears simply by alternate engagement of the two driving clutches is not possible because, in the two lowest forward gears, the sliding gear shaft sleeve used in reverse gear as the main shaft gear wheel of the output shaft must couple one and the same main shaft gear wheel to the output shaft and be actuated into its neutral position relative to the two adjacent main shaft gear wheels in order to engage reverse gear.

In a known change-speed gearbox having two countershaft transmissions as shown in DE PS 3,131,139, one countershaft each is used for each of the two countershaft transmissions in addition to the associated frictional driving clutch. A reverse-gear countershaft gear wheel is arranged on one countershaft together with an associated shifting clutch and can be driven, via the intermediate gear wheel, by that main shaft gear wheel which is connected directly to the driving clutch engaged both in a normal reverse gear and in first gear. The first gear countershaft gear wheel is arranged on the other countershaft and is connected to this countershaft by a synchronized shifting clutch so as to mesh with a main shaft gear wheel of the other countershaft transmission. Both in the two lowest forward gears and in the normal reverse gear, the driving torque is transmitted via one and the same countershaft gear wheel, which is here connected by engagement of an associated change-speed clutch to its countershaft exhibiting the reverse-gear countershaft gear wheel and meshes with a main shaft gear wheel seated in a manner rotatably fixed manner on the output shaft. With this complicated transmission arrangement, it would be in principle be possible by additional engagement also of the shifting clutch of the reverse-gear countershaft gear wheel to effect a shift between the normal reverse gear and the second gear simply by alternative engagement of the two driving clutches.

An object on which the present invention is based consists essentially in providing a change-speed gearbox and method having six forward gears and one synchronized reverse gear and having two countershaft transmissions and only one countershaft in which "rocking out" of the motor vehicle, which has become stuck due to spinning driving wheels, is possible, i.e., rapid shifting between forward and reverse travel simply by alternate engagement of the two driving clutches.

Starting from a change-speed gearbox of the general type discussed above, the foregoing object has been achieved in an advantageous manner by connecting the reverse-gear countershaft gear wheel to the countershaft by a synchronized change-speed clutch containing the shifting clutch for the first-gear countershaft gear wheel. The main shaft gear wheel which is used for the main shaft gear wheel meshing with the intermediate gear wheel is connected directly to the driving clutch engaged in first gear and meshes with the first gear countershaft gear wheel.

In the change-speed gearbox according to the present invention, it is advantageous that the intermediate gear wheel and the first-gear countershaft gear wheel mesh with one and the same main shaft gear wheel and that this countershaft gear wheel is arranged next to the reverse-gear countershaft gear wheel. The result is that one change-speed clutch can be used for both the first gear and the reverse gear, and the intermediate gear wheel can be over-mounted in a simple manner at one casing wall. The internal shift condition of the transmission for "rocking out" can thus be simply produced by one change-speed clutch being actuated into the reverse gear position and a different change-speed clutch from the latter being actuated into that multi-position in which the gear wheel stage concerned transmits the driving torque to the output shaft both in reverse gear and in second gear.

BRIEF DESCRIPTION OF THE DRAWINGS

These and other objects, features and advantages of the present invention will become more apparent from the following detailed description of a presently preferred embodiment when taken in conjunction with the accompanying sole figure which schematically illustrates a change-speed gearbox in accordance with the present invention.

DETAILED DESCRIPTION OF THE DRAWINGS

An input shaft 1 and a coaxial output shaft 2 are connected to one another by two countershaft transmissions 3, 4 having a single common countershaft 7. The countershaft 7 is parallel to the input shaft 1.

The countershaft transmission 3 is connected by a frictional driving clutch 8 to the input shaft 1 via a drive shaft 5, which is coaxial to the input shaft 1 and, for its part, is rotatably fixed to a main shaft gear wheel 10. The countershaft transmission 3 has three gear wheel stages 18, 19, 20 disposed one behind the other in the axial directions of the main shafts 1, 2, 5. The gear wheel stages 18, 19, 20 are changed by two change-speed clutches 15, 16. Gear wheel state 18 comprises the main shaft gear wheel 10 and a first gear countershaft gear wheel 11 which meshes with the gear wheel 10 and is rotatably mounted on the countershaft 7 via its hub 31.

Gear wheel stage 19 comprises an intermediate gear wheel 17 which also meshes with the main shaft gear wheel 10 and a reverse-gear wheel 12 meshing with the gear wheel 10. The countershaft gear wheel 12 is also rotatably mounted on the countershaft 7. The countershaft gear wheels 11, 12 can be optionally coupled to the countershaft 7 by the change-speed clutch 15.

Gear wheel stage 20 comprises a main shaft gear wheel 14 rotatably mounted on the output shaft 2 and a countershaft gear wheel 13 meshing with the main shaft gear wheel 14. The countershaft gear wheel 13 is rotatably fixed to the hub 31 and thus likewise is rotatably mounted on the countershaft 7.

The countershaft transmission 4 is connected by a further frictional driving clutch 9 to the input shaft via a hollow drive shaft 6 concentric to the drive shaft 5. The drive shaft 6 drives a constant gear wheel stage 21 of the countershaft transmission 4. The stage 21 is arranged spatially between, on the one hand, the driving clutches 8, 9 and, on the other hand, countershaft transmission 3. The gear wheel stage 21 comprises a main shaft gear wheel 22 rotatably mounted on the central drive shaft 5 and rotatably fixed to drive shaft 6 and a countershaft gear wheel 23 which meshes with the main shaft gear wheel 22 and is coaxially and rotatably fixed with respect to the countershaft 7.

The countershaft transmission 4 has two gear wheel stages 24 and 27. The main shaft gear wheels 25, 28 of these stages can optionally be coupled to the output shaft 2 by a further change-speed clutch 30. The countershaft gear wheels 26, 29 of the two gear wheel stages 24, 27 mesh with the respective main shaft gear wheels 25, 28 and are fixed to the countershaft 7 so as to be rotatable together.

To select the first gear, the gear wheel stage 18 of countershaft transmission 3 is connected into the drive connection between the input and output shafts 1, 2 by the change-speed clutch 15. The gear wheel stage 24 of the countershaft transmission 4 is connected into the drive connection by the change-speed clutch 30 and the driving clutch 8 is engaged, so that force is transmitted from the input shaft 1, via the drive shaft 5 and gear wheel stage 18, to the countershaft 7 and from the countershaft 7, via the gear wheel stage 24, to the output shaft 2.

To select the second gear, the force continues to be transmitted from the countershaft 7 to the output shaft 2 via the gear wheel stage 24 of the countershaft transmission 4, but the driving clutch 8 is now disengaged and the driving clutch 9 is engaged, so that the driving torque is transmitted from the input shaft 1, via the drive shaft 6 and the gear wheel stage 21 of the countershaft transmission 4, to the countershaft 7. The countershaft transmission 3 is thus not involved in the formation of second gear.

To select the third gear, the gear wheel stage 20 of the countershaft transmission 3 is connected into the drive connection by the change-speed clutch 16. The driving clutch 9 is disengaged and the driving clutch 8 is again engaged, so that the force is transmitted from the input shaft 1, via the drive shaft 5 and the gear wheel stage 18, to the hub 31 and from the hub 31, via the gear wheel stage 20, to the output shaft 2. The countershaft transmission 4 is thus not involved in the formation of third gear.

To select the fourth gear, the gear wheel stage 27 of the countershaft transmission 4 is connected into the drive connection by the change-speed clutch 30 and the driving clutch 8 is disengaged and driving clutch 9 is again engaged, so that the force is transmitted from the input shaft 1, via the drive shaft 6 and the gear wheel stage 21, to the countershaft 7 and from the countershaft 7, via the gear wheel stage 27, to the output shaft 2. The countershaft transmission 3 is thus not involved in the formation of fourth gear.

To select the fifth gear, the drive shaft 5 and the output shaft 2 are coupled by the change-speed clutch 16, and the driving clutch 9 is disengaged and the driving clutch 8 is once again engaged, so that the force is transmitted directly, without conversion by the countershaft transmissions, from the input shaft 1, via the drive shaft 5, to the output shaft 2.

To select the sixth gear, the gear wheel stage 18 of countershaft transmission 3 is connected into the driving connection by the change-speed clutch 15, and the driving clutch 8 is disengaged and the driving clutch 9 is once again engaged, with the result that the force is transmitted from the input shaft 1, via the drive shaft 6 and the gear wheel stage 21 of the countershaft transmission 4, to the countershaft 7 and from the countershaft 7, via gear wheel stage 18 of the countershaft transmission 3, to the output shaft 2.

In reverse gear, the gear wheel stage 19 of the countershaft transmission 3 is connected into the driving connection by the change-speed clutch 15 and the gear wheel stage 24 of the countershaft transmission 4 by the change-speed clutch 30. The driving clutch 8 is engaged, with the result that the force is transmitted from the input shaft 1, via the drive shaft 5 and the gear wheel stage 19, to the countershaft 7 and from the countershaft 7, via the gear wheel stage 24, to the output shaft 2.

In a shift position for driving away, for "rocking out" the vehicle by shifting several times between forward and reverse travel, the main shaft gear wheel 25 of the gear wheel stage 24 of the countershaft transmission 4, which gear wheel 25 is used to form both the second gear and the reverse gear, is coupled to the output shaft 2 by the change-speed clutch 30, and the reverse-gear countershaft gear wheel 12 of the countershaft transmission 3 is coupled to the countershaft 7 by the change-speed clutch 15. It is now possible for the change-speed gearbox to be shifted into the second gear or into the reverse gear simply by alternate engagement of driving clutches 8, 9 in order to obtain the known "rocking out" effect.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle change-speed gearbox, comprising a common countershaft, two countershaft transmissions operatively associated with the common countershaft, an input shaft, an output shaft coaxial with the input shaft operatively arranged to be brought into driving connection with the input shaft by at least one of the two countershaft transmissions, frictional driving clutches for selectively connecting the respective countershaft transmissions to the input shaft, a first-gear countershaft gear wheel and reverse-gear countershaft gear wheel of one of the countershaft transmissions being arranged on the common countershaft so as to be each connected into the driving connection in a first gear and in a reverse gear, a synchronized shifting clutch operatively arranged for connecting the first-gear countershaft gear wheel to the common countershaft, the reverse-gear countershaft gear wheel and a mean shaft gear wheel being arranged coaxially with the input shaft and meshing with an intermediate gear wheel, and a synchronized change-speed clutch containing the synchronized shifting clutch for the first-gear countershaft gear wheel operatively connecting the reverse-gear countershaft gear wheel to the common countershaft, wherein the main shaft gear wheel is both connected directly to the driving clutch engaged in the first gear and meshes with the first-gear countershaft gear wheel such that, during shifting for driving away, one of the frictional driving clutches is disengaged and the synchronized change-speed clutch of the reverse-gear countershaft gear wheel of the one countershaft transmission is engaged in a reverse gear, and thereafter a change-speed clutch of the other of the two countershaft transmissions connected to the frictional driving clutch which was disengaged in the first gear is engaged to establish a second gear.

2. A change-speed method, comprising the steps of:
selecting first gear by connecting a first gear wheel stage of a first countershaft transmission into a driving connection between input and output shafts, a first gear wheel stage of a second countershaft transmission is connected into the drive connection, and a first driving clutch is engaged to transmit a force from the input shaft, via the first gear wheel stage of the first countershaft transmission, to a common countershaft, and from the common countershaft, via the first gear wheel stage of the second countershaft transmission to the output shaft;

selecting second gear by continuing to transmit the force from the common countershaft, via the gear wheel stage of the second countershaft transmission, to the output shaft, and disengaging the first driving clutch and engaging a second driving clutch to transmit driving torque from the input shaft, via a second gear wheel stage of the second countershaft transmissions to the common countershaft;

selecting third gear by connecting a second gear wheel stage of the first countershaft transmission into the driving connection, and disengaging the second driving clutch and engaging the first driving clutch so that the force is transmitted from the input shaft, via the first gear wheel stage of the first countershaft transmission to a hub and from the hub, via the second gear wheel stage of the first countershaft transmission to the output shaft;

selecting fourth gear by connecting a third gear wheel stage of the second countershaft transmission into the driving connection, and disengaging the first driving clutch and engaging the second driving clutch so that the force is transmitted from the input shaft, via the second gear wheel stage of the second countershaft transmission, to the countershaft and from the countershaft, via the third gear wheel stage of the second countershaft transmission, to the output shaft;

selecting fifth gear by coupling a drive shaft and the output shaft, and disengaging the second driving clutch and engaging the first driving clutch so that the force is transmitted directly from the input shaft to the output shaft;

selecting a sixth gear by connecting the first gear wheel stage of the first countershaft transmission into the driving connection, and disengaging the first friction clutch and engaging the second friction clutch so that the force is transmitted, via the second gear wheel stage of the second countershaft transmission, to the countershaft and from the countershaft, via the first gear wheel stage of the first countershaft transmission, to the output shaft; and selecting reverse gear by connecting a third gear wheel stage of the first countershaft transmission and, the first gear wheel stage of the second countershaft transmission into the driving connection, and engaging the first driving clutch so that the force is transmitted from the input shaft, via the third gear wheel stage of the first countershaft transmission, to the countershaft and from the countershaft, via the first gear wheel stage of the second countershaft transmission, to the output shaft.

3. The change-speed method according to claim 2, further including the step of shifting between the second gear and the reverse gear by alternate engagement of the first and second driving clutches.

4. A motor vehicle change speed gearbox, comprising a common countershaft, two countershaft transmissions operatively associated with respect to the common countershaft, an input shaft, an output shaft coaxial with the input shaft and operatively arranged to be brought into driving connection with the input shaft by at least one of the two countershaft transmissions, frictional driving clutches for selectively connecting the respective countershaft transmissions to the input shaft, a first-gear countershaft gear wheel and reverse-gear countershaft gear wheel of one of the countershaft transmissions arranged on the common countershaft so as to be each connected into the driving connection in a first gear and in a reverse gear, a synchronized shifting clutch operatively arranged for connecting the first-gear countershaft gear wheel of the one countershaft transmission to the common countershaft, the reverse-gear countershaft gear wheel and a main shaft gear wheel of the one countershaft transmission being arranged coaxially with the input shaft and operatively arranged to mesh with an intermediate gear wheel, and a synchronized change-speed clutch containing the synchronized shifting clutch for the first-gear countershaft gear wheel operatively connecting the reverse-gear countershaft gear wheel to the common countershaft, wherein the main shaft gear wheel is both connected directly to the driving clutch engaged in the first gear and meshes with the first-gear countershaft gear wheel, a second synchronized change-speed clutch is operatively arranged to couple the main shaft gear wheel for forming the first gear with the output shaft, said second change-speed clutch being disengaged in the first gear and engaged in a sixth gear, and a third synchronized shifting clutch is operatively arranged to couple a second main shaft gear wheel, which in the first gear is in a force flow of the common countershaft to the output shaft, with the output shaft, and said third synchronized shifting clutch being engaged in the first gear and disengaged in the sixth gear such that, in the sixth gear, the driving clutch connecting with the first-mentioned main shaft gear wheel for the formation of the first gear is disengaged.

* * * * *